United States Patent
Ota (10) Patent No.: US 12,467,531 B2
(45) Date of Patent: Nov. 11, 2025

(54) CONVOY TRAVEL CONTROL DEVICE

(71) Applicant: TOYOTA JIDOSHA KABUSHIKI KAISHA, Toyota (JP)

(72) Inventor: Keisuke Ota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/951,680

(22) Filed: Nov. 19, 2024

(65) Prior Publication Data

US 2025/0251040 A1    Aug. 7, 2025

(30) Foreign Application Priority Data

Feb. 5, 2024   (JP) .................. 2024-015996

(51) Int. Cl.

| | |
|---|---|
| G05D 1/698 | (2024.01) |
| B60W 30/14 | (2006.01) |
| B60W 30/16 | (2020.01) |
| F16H 59/70 | (2006.01) |
| F16H 61/16 | (2006.01) |
| B60W 60/00 | (2020.01) |
| F16H 59/44 | (2006.01) |
| F16H 59/48 | (2006.01) |

(52) U.S. Cl.
CPC ........... *F16H 61/16* (2013.01); *B60W 30/143* (2013.01); *B60W 30/16* (2013.01); *G05D 1/6985* (2024.01); *B60W 60/0027* (2020.02); *B60W 2554/40* (2020.02); *B60W 2554/4042* (2020.02); *B60W 2554/4043* (2020.02); *F16H 59/44* (2013.01); *F16H 59/48* (2013.01); *F16H 59/70* (2013.01)

(58) Field of Classification Search
CPC .......... F16H 61/16; F16H 59/09; F16H 59/44; F16H 59/48; F16H 59/70; G05D 1/6985; B60W 2554/40–2556/65; B60W 60/0027; B60W 30/143; B60W 30/16
See application file for complete search history.

(56) References Cited

U.S. PATENT DOCUMENTS

| | | | | |
|---|---|---|---|---|
| 6,032,097 A | * | 2/2000 | Iihoshi ................. | G05D 1/0293 340/436 |
| 10,017,039 B1 | * | 7/2018 | Colavincenzo ....... | B60W 10/06 |
| 2018/0190128 A1 | * | 7/2018 | Saigusa ................. | B60W 40/04 |
| 2019/0025857 A1 | * | 1/2019 | Luckevich ............ | G05D 1/644 |
| 2020/0387167 A1 | * | 12/2020 | Sujan .................. | B60W 30/143 |
| 2023/0252901 A1 | | 8/2023 | Okuda et al. | |
| 2024/0326798 A1 | * | 10/2024 | Onuki ................. | B60W 30/143 |

FOREIGN PATENT DOCUMENTS

| | | |
|---|---|---|
| JP | 2023-032417 A | 3/2023 |
| JP | 2023-114386 A | 8/2023 |

* cited by examiner

*Primary Examiner* — Tinh Dang
(74) *Attorney, Agent, or Firm* — SoraIP, Inc.

(57) ABSTRACT

A target gear stage of the automatic transmission of the own vehicle (following vehicle) is determined based on the target acceleration (=required drive torque) and the target vehicle speed of the leading vehicle by the convoy participation time speed change control unit, and when the target gear stage and the actual gear stage of the own vehicle are different, the gear stage of the automatic transmission of the own vehicle is switched to the target gear stage in advance. Thus, the speed change of the following vehicle participating in the convoy traveling can be executed in advance on the gear stage for obtaining the driving force for following the leading vehicle, and disturbance of the convoy traveling is suppressed.

1 Claim, 5 Drawing Sheets

|  | C1 | C2 | C3 | B1 | B2 | F1 |
|---|---|---|---|---|---|---|
| 1st | O |  |  |  | (O) | O |
| 2nd | O |  |  | O |  |  |
| 3rd | O | O |  |  |  |  |
| 4th |  | O |  | O |  |  |
| Rev |  |  | O |  | O |  |
| N |  |  |  |  |  |  |

(O: ENGAGEMENT   BLANK: OPEN)

CONVOY TRAVEL CONTROL DEVICE

CROSS-REFERENCE TO RELATED APPLICATION

This application claims priority to Japanese Patent Application No. 2024-015996 filed on Feb. 5, 2024, incorporated herein by reference in its entirety.

BACKGROUND

1. Technical Field

The present disclosure relates to a convoy travel control device that optimizes a speed change timing of each vehicle of convoy participating vehicles that include a leading vehicle and a following vehicle, and suppresses an inter-vehicle distance from varying, by controlling a speed change of an automatic transmission of each of the vehicles.

2. Description of Related Art

When convoy traveling is performed by vehicles including a leading vehicle and a following vehicle that follows the leading vehicle by autonomous driving in one row separated by a predetermined inter-vehicle distance from the leading vehicle, a necessity or not of a speed change is determined from a traveling state (acceleration and deceleration request) of the leading vehicle. A convoy travel control device has been proposed in which a speed change timing of a vehicle group participating in convoy travel is aligned and an inter-vehicle distance is suppressed from being varied, by executing a speed change of an automatic transmission from a rear vehicle first when a speed change is necessary.

SUMMARY

However, in the conventional convoy travel control device, when the timing of the speed change of each vehicle is aligned, since switching to a gear stage for obtaining a driving force in order to follow in the following vehicle is delayed from an optimum speed change timing, there is a possibility that the realization of the driving force required for quickly following in the following vehicle is delayed. For example, since the speed change of the following vehicle is started after an acceleration and deceleration request of the leading vehicle is received, a delay occurs until an optimum acceleration can be obtained. When convoy travel is controlled via inter-vehicle communication, there is a possibility that the delay induces a delay in acceleration and deceleration of the following vehicle and causes a disturbance in the convoy travel.

The present disclosure has been made in view of the circumstances as a background. An objective of the present disclosure is to provide a convoy travel control device that can execute a speed change to a gear stage in advance in order for a following vehicle participating in convoy travel to obtain a driving force that quickly follows a leading vehicle, and can suppress a disturbance in the convoy travel.

The main point of a first disclosure is
a convoy travel control device that automatically switches a speed change of an automatic transmission of a following vehicle from a traveling state of a leading vehicle when convoy travel is performed by a plurality of vehicles with autonomous driving, the convoy travel control device including a convoy participation time speed change control unit that determines a target gear stage of the automatic transmission of the following vehicle based on a target acceleration and a target vehicle speed of the leading vehicle and switches an actual gear stage of the automatic transmission of the following vehicle to the target gear stage in advance when the target gear stage and the actual gear stage of the automatic transmission of the following vehicle are different.

The main point of a second disclosure is, in the first disclosure, when a change in the target acceleration of the leading vehicle falls below a predetermined value, the convoy participation time speed change control unit switches the actual gear stage of the automatic transmission of the following vehicle to the target gear stage at a second speed change speed, and when a change in the target acceleration of the leading vehicle is equal to or more than the predetermined value, the convoy participation time speed change control unit switches the actual gear stage of the automatic transmission of the following vehicle to the target gear stage at a first speed change speed higher than the second speed change speed.

In the convoy travel control device of the first disclosure, the target gear stage of the automatic transmission of the following vehicle is determined, based on the target acceleration and the target vehicle speed of the leading vehicle, by the convoy participation time speed change control unit, and when the target gear stage and the actual gear stage of the following vehicle are different, the actual gear stage of the automatic transmission of the following vehicle is switched to the target gear stage in advance. As a result, a speed change of the following vehicle participating in convoy travel can be executed to the gear stage in advance in order for the following vehicle to obtain a driving force that follows the leading vehicle, and a disturbance in the convoy travel is suppressed.

In the convoy travel control device of the second disclosure, when a change in the target acceleration of the leading vehicle falls below a predetermined value, the convoy participation time speed change control unit switches the actual gear stage of the automatic transmission of the following vehicle to the target gear stage at a second speed change speed, and when a change in the target acceleration of the leading vehicle is equal to or more than the predetermined value, the convoy participation time speed change control unit switches the actual gear stage of the automatic transmission of the following vehicle to the target gear stage at a first speed change speed higher than the second speed change speed. As a result, since a speed change of the following vehicle participating in convoy travel is quickly executed at a first speed change speed higher than a second speed change speed in a manual driving state, for example, in order for the following vehicle to quickly obtain a sufficient driving speed that follows the leading vehicle, a disturbance in the convoy travel is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

As the vehicle participating in the convoy, a vehicle equipped with a driving power source such as an engine or an engine and an electric motor and a stepped automatic transmission can be used. The engine is an internal combustion engine such as a gasoline engine or a diesel engine.

The convoy speed change control unit may be provided in a server installed at a head office or a business office of a transportation company or the like that manages the convoy participating vehicles, or at any other place, for example, but may also be mounted on the convoy participating vehicles. The convoy participating vehicle includes, for example, one leading vehicle for autonomous driving and at least one following vehicle. As the convoy participating vehicle, an unmanned convoy participating vehicle may be used as long as it is capable of unmanned traveling, such as in the case of autonomous driving provided with an autonomous steering system or the like capable of traveling according to a predetermined traveling route.

Vehicles participating in a convoy have a function of following each other at a predetermined inter-vehicle distance. That is, the required driving force required for following the vehicle is calculated so that the inter-vehicle distance between the vehicle and the leading vehicle is maintained at a predetermined target inter-vehicle distance. By controlling the output of the driving force source so as to obtain the required driving force, follow-up travel control for following travel at the target inter-vehicle distance is executed. The required driving force corresponds to a required acceleration of the following vehicle.

In addition to the following travel control, the leading vehicle calculates a required driving force required to travel at a predetermined target vehicle speed or a target acceleration corresponding thereto, and controls the output of the driving force source so as to obtain the target acceleration and the target vehicle speed. The autonomous travel control may be one that performs constant speed travel traveling at a constant target vehicle speed, or one that automatically travels while changing the vehicle speed according to the target vehicle speed variably set according to the travel plan along the travel route. The following vehicle may also be capable of autonomous travel control as in the case of the leading vehicle. That is, it is not necessary to functionally distinguish between the leading vehicle and the following vehicle, and it is desirable that the leading vehicle or the following vehicle be configured so as to be able to arbitrarily participate in the convoy. The output control of the driving force source in the following travel control and the autonomous travel control is preferably controlled to include negative torque by engine braking, regenerative control of a rotary machine, or the like, and braking force control can be performed via an automatic braking system. Note that the leading vehicle may travel by controlling the output of the driving force source in accordance with the acceleration/deceleration operation of the driver.

The convoy participating vehicle may be composed of a plurality of types of vehicles on which automatic transmissions having different numbers of gear stages are mounted, but may be composed of only vehicles on which one type of automatic transmissions having the same number of gear stages are mounted.

Hereinafter, an embodiment of the present disclosure will be described in detail with reference to the drawings. Note that, in the following embodiments, the drawings are appropriately simplified or modified for the purpose of explanation, and the shapes, dimensional ratios, angles, and the like of the respective portions are not necessarily drawn accurately.

Figure 1:
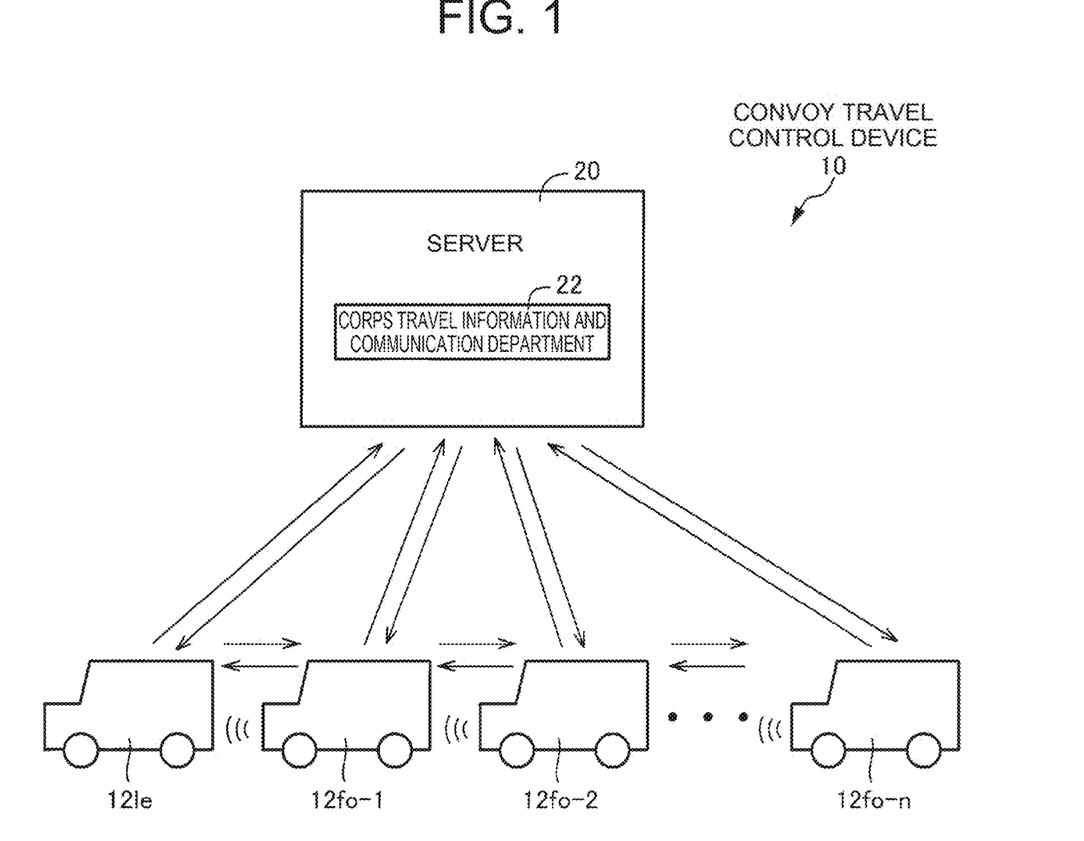
FIG. 1 is a schematic diagram illustrating a basic configuration of a convoy traveling system according to an embodiment of the present disclosure.

FIG. 1 is a schematic diagram illustrating a basic configuration of a convoy travel control device (system) 10 according to an embodiment of the present disclosure. The convoy travel control device 10 of the present embodiment includes a plurality of convoy participating vehicles 12*le*, 12*fo*-1, 12*fo*-2, . . . 12*fo-n* and a server 20 of a convoy managing center. Such convoy traveling is performed mainly on a road dedicated to an automobile such as an expressway. The convoy participating vehicle 12*le* is the leading vehicle of the convoy, and the convoy participating vehicles 12*fo*-1, 12*fo*-2, . . . 12*fo-n* are the following vehicles that automatically follow the leading vehicle 12*le* in one row at a predetermined inter-vehicle distance. In the following explanation, when the following vehicles 12*fo*-1, 12*fo*-2, . . . 12*fo-n* are not particularly distinguished, the following vehicles are referred to as following vehicles 12*fo*, and when the leading vehicle 12*le* and the following vehicles 12*fo* are not particularly distinguished, the vehicles are referred to as convoy participating vehicles 12. The server 20 is an electronic control unit such as a personal computer, and is provided in, for example, a head office or a business office of a company to which the convoy participating vehicles 12 belong, but a commercial facility or the like can also be used. The convoy traveling information communication unit 22 of the server 20 communicates information related to the speed change during the convoy traveling between the convoy participating vehicles 12*le*, 12*fo*-1, 12*fo*-2, . . . 12*fo-n*. For example, the target vehicle speed Vt of the leading vehicle 12*le* (i.e., the required vehicle speed Vdem) and the target acceleration (i.e., the required drive torque Trdem) required to travel at the target vehicle speed Vt are transmitted to the following vehicles 12*fo*.

Figure 2:
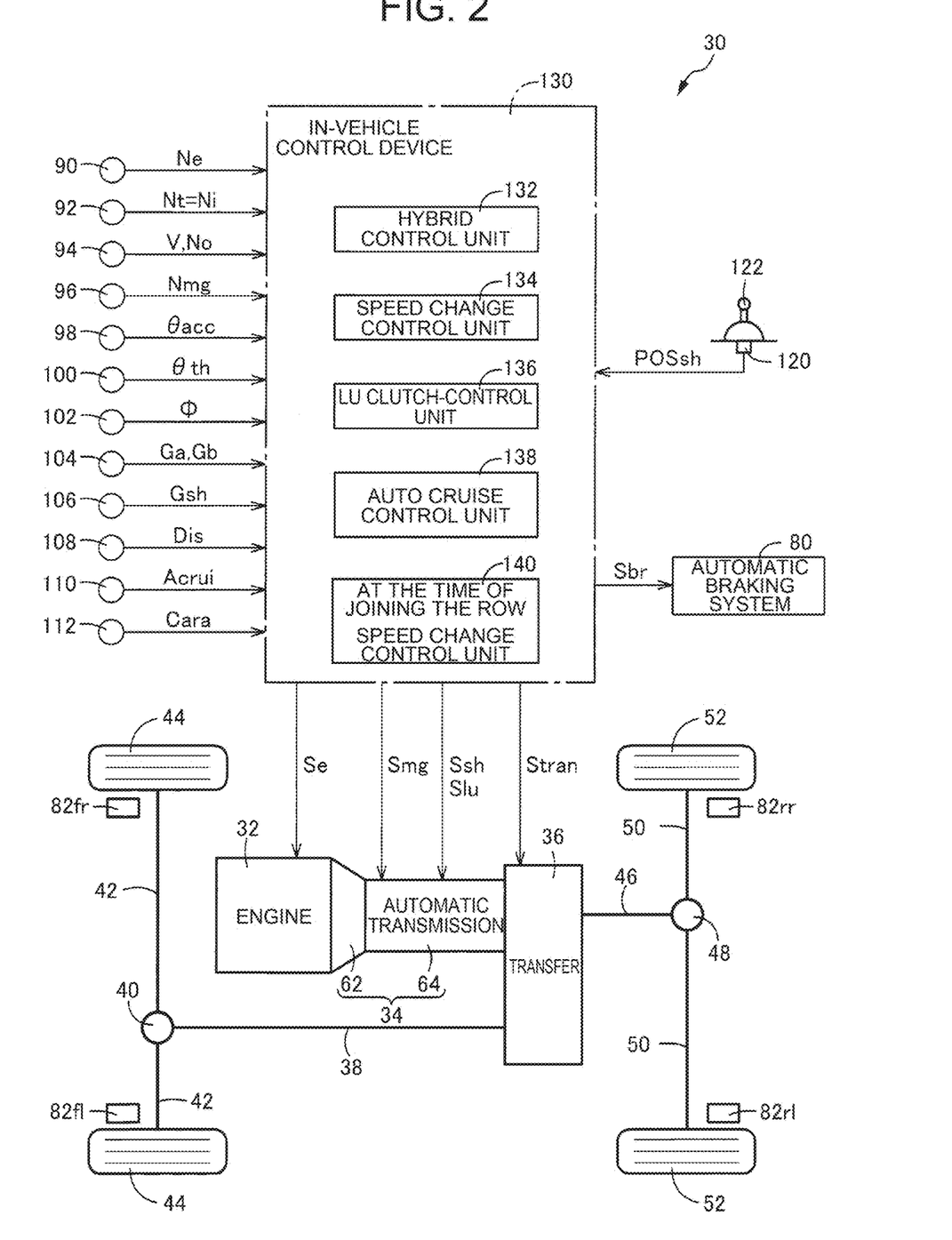
FIG. 2 is a diagram illustrating an example of a vehicle that can be used as the convoy participating vehicle of FIG. 1, and is a diagram illustrating a control function and a main part of a drive system.

FIG. 2 is a diagram for explaining an example of a plurality of vehicles 30 that can participate in a convoy as the convoy participating vehicles 12 in FIG. 1, and is a diagram illustrating a control function for various kinds of control and a main part of the control system together with a schematic diagram of the drive system. The vehicle 30 is a normal vehicle capable of running not only in a convoy but also in a single vehicle, and includes an in-vehicle control device 130. Then, when the vehicle 30 has participated in the train as the participating vehicle 12, between the in-vehicle control device 130 of the respective convoy participating vehicles 12, or between the server 20 of the in-vehicle control device 130 and the train management center, a mobile telephone network or a wireless LAN network, is connected via a network of wireless communication such as the Internet, it is possible to transmit and receive various types of information. Each of the in-vehicle control device 130 and the server 20 includes a so-called microcomputer including a CPU, RAM, ROM, an input/output interface, and the like, and can execute various types of signal-processing in accordance with programs stored in ROM.

Vehicle 30 of FIG. 2 is a hybrid-type electrified vehicle of front-rear wheel drive (four-wheel drive) based on a front-engine rear wheel drive system (FR). The vehicle 30 includes an engine 32, a power transmission device 34 for HEV connected to the engine 32, and a transfer 36 connected to the power transmission device 34. A front propeller shaft 38 and a rear propeller shaft 46 are coupled to the transfer 36. The driving force transmitted from the power transmission device 34 for the engine 32 and HEV to the transfer 36 is distributed to the front propeller shaft 38 and the rear propeller shaft 46 via the transfer 36. The front propeller shaft 38 is transmitted to the left and right front wheels 44 via the front wheel-side differential gear 40 and the left and right front wheel drive shafts 42. Further, the rear propeller shaft 46 is transmitted to the left and right rear wheels 52 via the rear wheel-side differential gear 48 and the left and right rear wheel drive shafts 50. The rear wheels 52 are main drive wheels which are both drive wheels in the case of two-wheel drive (2WD) travel and four-wheel drive (4WD) travel, and the front wheels 44 are sub drive wheels which become driven wheels in the case of 2WD travel and become drive wheels in the case of 4WD travel. In the engine 32, an engine control device (not shown) including a throttle actuator, a fuel injection device, an ignition device, and the like is controlled by the in-vehicle control device 130, so that an engine torque Te that is an output torque of the engine 32 is controlled.

Figure 3:
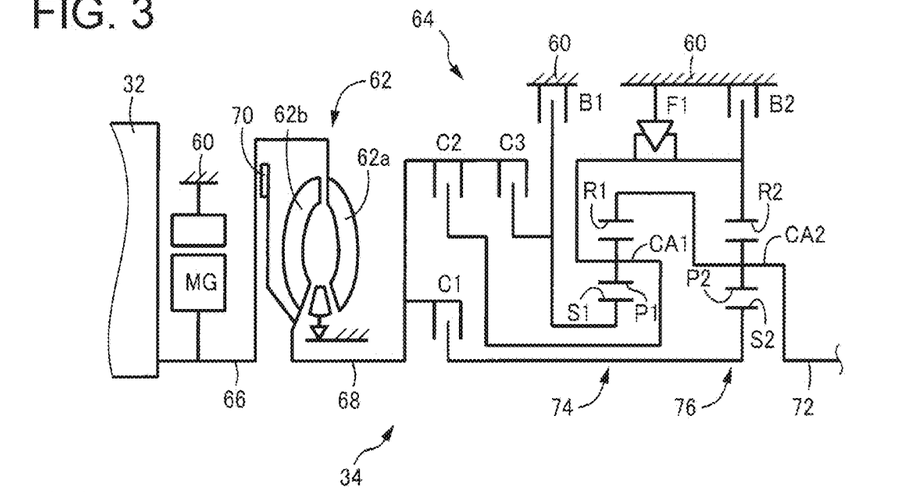
FIG. 3 is a skeleton diagram illustrating a specific example of the power transmission device of the vehicle of FIG. 2.

FIG. 3 is a skeleton diagram illustrating an example of the power transmission device 34 of the vehicle 30. The power transmission device 34 for an HEV includes a rotary machine MG disposed in a transmission case 60 (hereinafter, referred to as a case 60) as a non-rotating member attached to a vehicle body, and a stepped automatic transmission 64 connected to the rotary machine MG and the engine 32 via a torque converter 62. The rotary machine MG, the torque converter 62, and the automatic transmission 64 are configured substantially symmetrically with respect to the center line, and the lower half of the center line is omitted in the skeletal diagram of FIG. 3. The rotary machine MG is a motor generator having functions as an electric motor and a generator, and is, for example, a three-phase alternating current synchronous motor or the like. In the rotary machine MG, an MG torque Tmg that is a torque of the rotary machine MG and an MG rotational speed Nmg that is a rotational speed of the rotary machine MG are controlled by the in-vehicle control device 130. The rotary machine MG is used as a driving source, and generates driving force for traveling in place of the engine 32 or in addition to the engine 32. The rotary machine MG generates electric power by performing regenerative control so as to function as a generator when the rotary machine is rotationally driven by the power of the engine 32 or the driven force inputted from the front and rear wheels 44 and 52, and generates regenerative braking when the rotary machine is connected to the front and rear wheels 44 and 52. The rotary machine MG is connected directly to the crankshaft of the engine 32 or via a damper (not shown) or the like. An engine disconnect clutch or the like may be provided between the rotary machine MG and the engine 32 to disconnect the power transmission.

The torque converter 62 includes a pump impeller 62a coupled to a rotary machine MG via a MG coupling shaft 66, and a turbine impeller 62b coupled to an input shaft 68 of an automatic transmission 64. The torque converter 62 includes a LU (lockup) clutch 70 that connects the pump impeller 62a and the turbine impeller 62b. In LU clutch 70, LU clutch torque Tlu, which is the torque capacity of LU clutch 70, is changed by controlling LU hydraulic pressure PRlu by the in-vehicle control device 130. The operating or control state is the open state of LU clutch 70, the slipped state of LU clutch 70, and the complete engagement of LU clutch 70.

Figure 4:
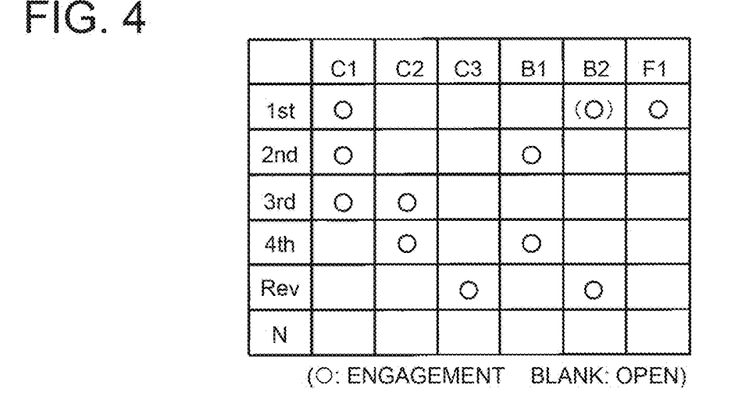
FIG. 4 is an engagement operation table showing a relationship between a plurality of gear stages of the stepped automatic transmission provided in the power transmission device of FIG. 3 and an engagement open state of an engagement device for establishing the gear stages.

The automatic transmission 64 includes a single pinion type first planetary gear unit 74 and a second planetary gear unit 76. This is a planetary gear-type stepped automatic transmission in which a plurality of gear stage Gsh with different gear ratios γ=[input rotational speed Ni/the rotational speed (output rotational speed) No of the output shaft 72] is mechanically established. In the automatic transmission 64, the hydraulic clutch C1, C2, C3 and the hydraulic braking B1, B2 are engaged according to the engagement operation chart shown in FIG. 4, so that the four forward speeds of the first gear stage "1st" to the fourth gear stage "4th" are alternately established as the plurality of gear stage Gsh, and the reverse gear stage "Rev" is established. When the engagement device CB is entirely opened, a neutral "N" for shutting off the power transmission is obtained. "(∘)" in parentheses in FIG. 4 means engagement when the engine brake is activated.

Returning to FIG. 2, the transfer 36 includes, for example, a sub speed changer that speed change the rotation transmitted from the output shaft 72 of the automatic transmission 64 in two stages of high (transfer Hi) and low (transfer Lo), a distribution mechanism that distributes the driving force output from the sub speed changer to the front propeller shaft 38 and the rear propeller shaft 46 at a predetermined distribution ratio, a defrock device that limits the differential rotation of the front propeller shaft 38 and the rear propeller shaft 46, and a two-four-wheel switching device that switches between a two-wheel drive that drives only the rear wheels 52 and a four-wheel drive that drives the front and rear wheels 44 and 52. The high-low switching device, the differential lock device, and the two-to-four switching device of the sub speed changer are electrically controlled by the in-vehicle control device 130. A transfer 36 that can electrically control the distribution ratio of the driving force to the front propeller shaft 38 and the rear propeller shaft 46 can also be employed.

The in-vehicle control device 130 includes a so-called microcomputer, and performs various kinds of control of the vehicle 30 by performing signal processing in accordance with a program stored in advance. The in-vehicle control device 130 includes a plurality of electronic control devices such as an engine-control device, a MG control device, and a hydraulic control device as needed.

In the in-vehicle control device 130, various signals and the like (e.g., an engine rotational speed Ne that is a rotational speed of the engine 32, a turbine rotational speed Nt that is the same value as an input rotational speed Ni, an output rotational speed No that corresponds to a vehicle speed V, an MG rotational speed Nmg that is a rotational speed of the rotary machine MG, an accelerator operation amount θacc that is an operation amount of an acceleration operation amount such as an accelerator pedal and corresponds to a required driving force Frdem of a driver, a throttle valve opening degree θth that is an opening degree of an electronic throttle valve, an operation position POSsh of the shift lever 122, the road surface gradient Φ, the longitudinal acceleration Ga and the lateral acceleration Gb of the vehicle 30, the gear stage Gsh of the automatic transmission 64, the inter-vehicle distance Dis to the leading vehicle, the auto-cruise setting information Acrui, the convoy participation information Cara, the signals representing the operation positions POSsh of the shift lever 122, and the like) based on detection values of various sensors (e.g., an engine rotational speed sensor 90, a turbine rotational speed sensor 92, an output rotational speed sensor 94, an MG rotational speed sensor 96, an accelerator operation amount sensor 98, a throttle valve opening degree sensor 100, a road surface gradient sensor 102, an acceleration sensor 104, a gear stage detection device 106, an inter-vehicle distance sensor 108 such as a millimeter wave radar, an auto-cruise setting device 110, a convoy participation device 112, a lever position sensor 120, and the like) provided in the vehicle 30 are individually supplied. The gear stage detection device 106 can detect the gear stage Gsh from the operating condition of the engagement device CB of the automatic transmission 64, for example, but may specify the gear stage Gsh by calculating the gear ratio 7 from the input rotational speed Ni and the output rotational speed No.

The shift lever 122 is a shift operation member operated by a driver and includes a plurality of operation positions POSsh. As the operation positions POSsh, for example, a plurality of positions P, R, N, and D are provided. The shift lever 122 may be provided with an operation position POSsh for switching the power transmission status of the transfer 36.

The auto-cruise setting device 110 is a device that selects auto-cruise traveling in which constant-speed traveling and following traveling are performed as auto-driving that automatically controls the engine 32 and the rotary machine MG, which are driving force sources, so as to travel in a predetermined target traveling state (target vehicle speed Vt or target inter-vehicle distance Dt) without requiring an acceleration/deceleration operation by the driver. That is, the vehicle 30 of the present embodiment is capable of auto-cruise driving in which the engine 32 and the rotary machine MG are controlled in accordance with the acceleration/deceleration of the driver by an accelerator pedal or the like, and in addition to manual driving in which the engine 32 and the rotary machine MG are automatically controlled in accordance with the target vehicle speed Vt or the like. The auto-cruise setting device 110 is a device that selects an auto cruise travel, sets a target vehicle speed Vt, increases or decreases the target vehicle speed Vt, and sets a target inter-vehicle distance Dt during the following travel that follows the leading vehicle. For example, the target vehicle speed Vt, the target inter-vehicle distance Dt, and the like are inputted by the driver as the auto-cruise setting information Acrui.

The convoy participation device 112 is a device that is operated when joining a convoy as the leading vehicle 12*le* or the following vehicle 12*fo* and traveling, and either joins as the leading vehicle 12*le* or joins as the following vehicle 12*fo*, or the traveling order when joining as the following vehicle 12*fo* and the like are inputted by the driver as the convoy participation information Cara. Except when it is registered in advance in the in-vehicle control device 130 by the initial setting or the like, the identification number that can individually identify the vehicle 30, the speed changer information including the number of stages of the gear stage Gsh of the automatic transmission 64 mounted, the driver may be inputted as a train participating information Cara.

Various command signals (for example, an engine control command signal Se, MG control command signal Smg, LU control command signal Slu, a speed change control command signal Ssh, a transfer control command signal Stran, and the like) for controlling the respective devices (for example, the engine 32, the rotary machine MG, LU clutch 70, the automatic transmission 64, the transfer 36, and the like) provided in the vehicle 30 are outputted from the in-vehicle control device 130.

Vehicle 30 also includes an automatic braking system 80 in connection with auto-cruise travel. The automatic braking system 80 electrically controls the braking force, i.e., the brake hydraulic pressure, of the wheel brakes 82*fl*, 82*fr*, 82*rl*, 82*rr* (hereinafter, referred to as the wheel brake 82 unless otherwise distinguished) provided on the front wheels 44 and the rear wheels 52 in accordance with the automatic brake control command Sbr supplied from the in-vehicle control device 130. The wheel brake 82 is also supplied with a brake hydraulic pressure via a brake master cylinder when a brake pedal (not shown) is depressed, and mechanically generates a braking force corresponding to the brake hydraulic pressure, that is, the braking force.

The in-vehicle control device 130 functionally includes a hybrid control unit 132, a speed change control unit 134, a LU clutch control unit 136, an auto-cruise control unit 138, and a convoy participation time speed change control unit 140 in order to realize various controls in the vehicle 30.

The hybrid control unit 132 cooperatively controls the operation of the engine 32 and the rotary machine MG. The hybrid control unit 132 calculates a driving request amount for the vehicle 30 by the driver by applying the accelerator operation amount θacc and the vehicle speed V to the required driving force map, for example. The drive required amounts are, for example, the total required driving force Frdem and the required drive torque Trdem of the front and rear wheels 44 and 52, and correspond to the required acceleration of the vehicle 30. The hybrid control unit 132 considers the transmission loss, the auxiliary load, the gear ratio γ of the automatic transmission 64, the torque ratio of the torque converter 62, and the like. For example, a required TC input torque Ttcdem which is an input torque of the torque converter 62 required to realize the required drive torque Trdem is obtained. In order to obtain the required TC input torque Ttcdem, an engine control command signal Se for controlling the engine 32 is output, and a MG control command signal Smg for controlling the rotary machine MG is output.

The hybrid control unit 132 adopts a BEV running mode that is a motor running mode in which the rotary machine MG is driven to perform traveling when only the output of the rotary machine MG can cover the required TC input torque Ttcdem. In BEV traveling mode, the operation of the engine 32 is stopped, and BEV traveling is performed using only the rotary machine MG as a driving force source. When an engine disconnection device is provided between the rotary machine MG and the engine 32, it is desirable to open the engine disconnection device and disconnect the engine 32 from the power transmission path to suppress the engine from rotating together. In this BEV mode-of-travel, MG torque Tmg is controlled to achieve the required TC input torque Ttcdem. On the other hand, when the required TC input torque Ttcdem cannot be met without using at least the output of the engine 32, the hybrid control unit 132 sets HEV running mode as the engine running mode. In HEV traveling mode, at least the engine 32 is used as a driving force source to perform engine traveling, that is, HEV traveling. In this HEV mode-of-travel, the engine torque Te is controlled to achieve all or part of the required TC input torque Ttcdem. MG torque Tmg is controlled so as to compensate for the amount of torque which is insufficient in the engine torque Te for the required TC input torque Ttcdem. On the other hand, even when the required TC input torque Ttcdem is provided only by the output of the rotary machine MG, the hybrid control unit 132 establishes HEV traveling mode when warm-up of the engine 32 or the like is required.

Figure 5:
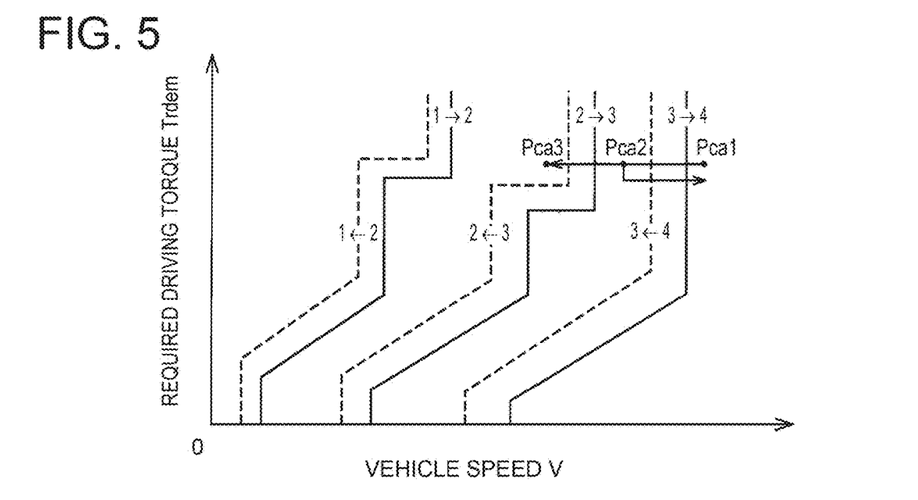
FIG. 5 is a diagram for explaining an example of a speed change map used by a shift control unit functionally provided in the in-vehicle control device of the vehicle of FIG. 2 in speed change control of the speed change unit of FIG. 3.

When the D range is selected, the speed change control unit 134 determines the speed change of the automatic transmission 64 in accordance with a speed change condition such as a speed change map determined in advance using, for example, a traveling state such as a vehicle speed V or a required drive torque Trdem as a variable. An automatic shift control for outputting a speed change control command signal Ssh for automatically switching a plurality of gear stage Gsh of the automatic transmission 64 is executed as needed. FIG. 5 is an exemplary speed change map in which the four-stage speed changer of FIG. 3 is provided as the automatic transmission 64, and the required drive torque Trdem and the vehicle speed V are determined as variables. The solid line is an upshift line for making an upshift determination, and the broken line is a downshift line for making a downshift determination. The speed change map is determined so that the driving force source (the engine 32 and the rotary machine MG) is operated in an appropriate operating region, for example, in a torque region or a rotational speed region, in accordance with the required drive torque Trdem and the vehicle speed V. The required drive torque Trdem corresponds to a driving required amount, and a required driving force Frdem, an accelerator operation amount θacc, or the like may be used instead of the required drive torque Trdem. In addition, an output rotational speed No or the like may be used instead of the vehicle speed V.

The speed change control unit 134 executes manual speed change control for switching the gear stage Gsh of the automatic transmission 64 in accordance with the speed change instruction when the manual shift operating member provided in the vicinity of the shift lever 122 or the driver's seat is operated by the driver and the speed change instruction signal is supplied.

Figure 6:
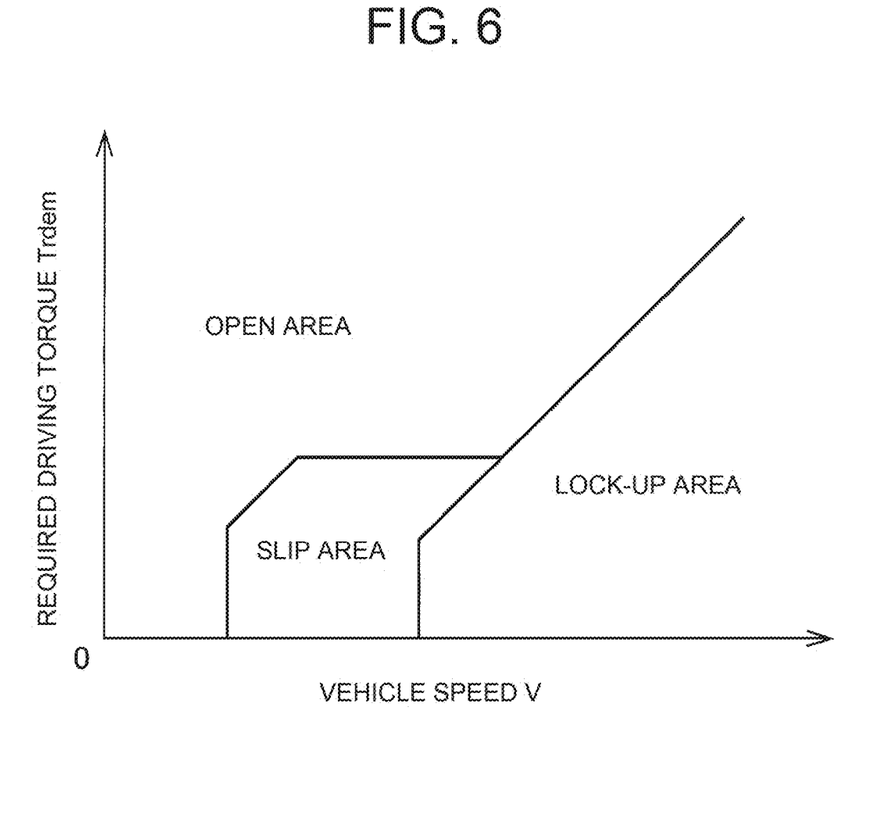
FIG. 6 is a view for explaining an exemplary LU clutch switching map used in the lock-up control by LU clutch control unit functionally provided in the in-vehicle control device of the vehicle of FIG. 2.

LU clutch control unit 136 switches and controls the operation status of LU clutch 70, and executes lock-up control for controlling LU hydraulic pressure PRlu corresponding to the lock-up differential pressure of LU clutch 70. LU clutch control unit 136 switches the operating state of LU clutch 70 between the open state, the slip state, and the lock-up state in accordance with a lock-up clutch switching condition that is determined in advance by, for example, a traveling state such as the vehicle speed V and the required drive torque Trdem. FIG. 6 is an exemplary LU clutch switching map that is a lock-up clutch switching condition. Three regions are defined: an open region for bringing LU clutch 70 into an open state, a slip region for bringing the predetermined slip state, and a lock-up region for bringing the vehicle speed V and the required drive torque Trdem into an engaged state.

The auto-cruise (autonomous driving) control unit 138 executes auto-cruise traveling, which is autonomous driving, in response to an operation of the auto-cruise setting device 110. The auto-cruise traveling performs autonomous traveling without requiring an acceleration/deceleration operation of the driver, and executes constant-speed traveling control of traveling at a constant speed at a target vehicle speed Vt set by the auto-cruise setting device 110, and follow-up traveling control of following traveling while holding a target inter-vehicle distance Dt set by the auto-cruise setting device 110. In the constant speed traveling control, a required drive torque Trdem required for traveling at the target vehicle speed Vt is calculated, and a required TC input torque Ttcdem required for realizing the required drive torque Trdem is obtained by considering the transmission loss, the auxiliary load, the gear ratio γ of the automatic transmission 64, the torque ratio of the torque converter 62, and the like. Then, an engine control command signal Se for controlling the engine 32 is output and a MG control command signal Smg for controlling the rotary machine MG is output so as to obtain the required TC input torque Ttcdem. The required drive torque Trdem is obtained by feedback control, feed-forward control, or the like on the basis of, for example, a difference between the target vehicle speed Vt and the actual vehicle speed V. On the other hand, in the following travel control that follows while maintaining the target inter-vehicle distance Dt with respect to the leading vehicle 12le, the auto-cruise control unit 138 calculates the required drive torque Trdem required for following travel so that the inter-vehicle distance Dis set by the auto-cruise setting device 110 becomes the target inter-vehicle distance Dt. The engine torque Te and MG torque Tmg are controlled so as to obtain the required drive torque Trdem. The target inter-vehicle distance Dt is variably set according to, for example, the vehicle speed V. In addition, when the required drive torque Trdem is negative, such as when the leading vehicle 12le is decelerated, a regenerative brake is generated by the engine brake or the rotary machine MG, or when required, a negative required drive torque Trdem is obtained together with the braking force of the wheel brake 82 controlled by the automatic braking system 80.

When the vehicle 30 that is traveling on an auto-cruise is participating in the convoy travel as the following vehicle 12fo by operating the convoy participation device 112, the convoy participation time speed change control unit 140 prohibits the automatic speed change control and the manual speed change control by the speed change control unit 134. Based on the target acceleration (i.e., the required drive torque Trdem) and the target vehicle speed Vt (i.e., the required vehicle speed Vdem) of the leading vehicle 12le during the auto cruise running, the target gear stage Gsht of the automatic transmission 64 of the following vehicle 12fo is determined from the speed change map of FIG. 5. When the target gear stage Gsht differs from the actual gear stage Gsh of the following vehicle 12fo, the gear stage Gsh of the automatic transmission 64 of the following vehicle 12fo is switched to the target gear stage Gsht in advance.

Then, when the change ΔTrdem of the target acceleration (required drive torque Trdem) of the leading vehicle 12le falls below the predetermined value ΔT1, the convoy participation time speed change control unit 140 switches the gear stage Gsh of the automatic transmission 64 of the following vehicle 12fo to the target gear stage Gsht at the second speed change speed SV2 equivalent to that at the time of the manual speed change control. When the change in the target acceleration of the leading vehicle 12le is equal to or greater than the predetermined value ΔT1, the gear stage Gsh of the automatic transmission 64 of the following vehicle 12fo is switched to the target gear stage Gsht at the first speed change speed SV1 higher than the second speed change speed SV2. The predetermined value ΔT1 is determined experimentally in advance so that the sense of delay in acceleration/deceleration is not conspicuous.

Figure 7:
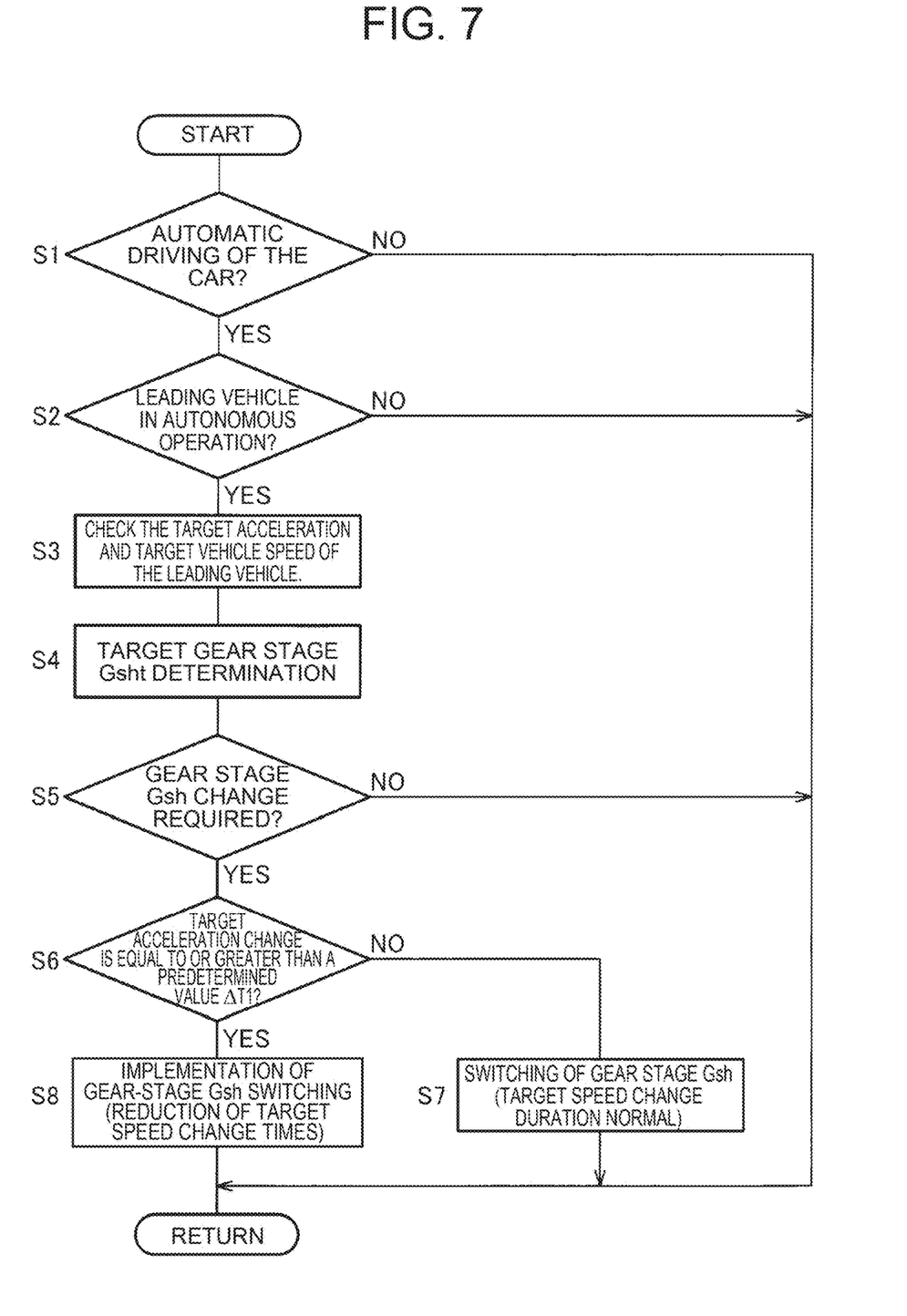
FIG. 7 is a flowchart for specifically explaining the convoy speed change control executed by the convoy speed change control unit functionally included in the server of FIG. 1.

FIG. 7 is a flowchart for explaining a control operation of a main part of a control operation of the in-vehicle control device 130, that is, a control operation of the convoy participation time speed change control unit 140. In FIG. 7, in S1 (hereinafter, steps are omitted), it is determined whether the own vehicle (following vehicle 12fo) is in autonomous driving. If the determination of S1 is negative, the routine is terminated, but if the determination of S1 is affirmative, it is determined whether S2 is autonomous driving of the leading vehicle 12le. If the determination of S2 is negative, the present routine is terminated, but if the determination of S2 is affirmative, the target acceleration (=required drive torque Trdem) and the target vehicle speed Vt of the leading vehicle 12le are read in S3.

Next, in S4, the target gear stage Gsht of the own vehicle is set, for example, based on the required drive torque Trdem and the target vehicle speed Vt of the leading vehicle 12le from the speed change map of FIG. 5. Next, in S5, whether the speed change of the automatic transmission 64 of the own vehicle is required is determined based on whether the actual gear stage Gsh of the own vehicle is different from the target gear stage Gsht. When the determination of S5 is negative, the present routine is terminated, but when the determination of S5 is affirmative, it is determined in S6 whether the change ΔTrdem of the target acceleration (=required drive torque Trdem) of the leading vehicle 12le is set in advance but is equal to or greater than the predetermined value ΔT1. When the determination of S6 is negative, that is, when the change ΔTrdem of the target acceleration (required drive torque Trdem) of the leading vehicle 12le falls below the predetermined value ΔT1, the gear stage Gsh of the automatic transmission 64 of the following vehicle 12fo is switched to the target gear stage Gsht at the second speed change speed SV2 equivalent to that at the time of the manual speed change control in S7. However, when the determination of S6 is affirmative, that is, when the change in the target acceleration of the leading vehicle 12le is equal to or greater than the predetermined value ΔT1, the gear stage Gsh of the automatic transmission 64 of the following vehicle 12fo is quickly switched to the target gear stage Gsht at the first speed change speed SV1 higher than the second speed change speed SV2.

According to the convoy travel control device 10 of the present embodiment, the convoy participation time speed change control unit 140 determines the target gear stage Gsht of the automatic transmission 64 of the own vehicle (following vehicle 12fo) on the basis of the target acceleration (=required drive torque Trdem) and the target vehicle speed Vt of the leading vehicle 12le. When the target gear stage Gsht differs from the actual gear stage Gsh of the own vehicle, the gear stage Gsh of the automatic transmission 64 of the own vehicle is switched to the target gear stage Gsht in advance. Thus, the speed change of the following vehicle 12fo participating in the convoy traveling can be executed in advance on the gear stage for obtaining the driving force for following the leading vehicle 12le, and disturbance of the convoy traveling is suppressed.

Further, according to the convoy travel control device 10 of the present embodiment, when the change ΔTrdem of the target acceleration (=required drive torque Trdem) of the leading vehicle 12le falls below the predetermined value ΔT1, the convoy participation time speed change control unit 140 switches the gear stage Gsh of the automatic transmission 64 of the following vehicle 12fo to the target gear stage Gsht at the second speed change speed SV2 equivalent to the manual speed change control. When the change in the target acceleration of the leading vehicle 12le is equal to or greater than the predetermined value ΔT1, the gear stage Gsh of the automatic transmission 64 of the following vehicle 12fo is switched to the target gear stage Gsht at the first speed change speed SV1 higher than the second speed change speed SV2. As a result, the speed change of the following vehicle 12fo participating in the convoy traveling is quickly executed at a first speed change speed higher than the second speed change speed in the manual driving condition, for example, in order to quickly obtain enough driving force to follow the leading vehicle 12le, so that disturbance of the convoy traveling is suppressed.

Although the embodiments of the present disclosure have been described in detail with reference to the drawings, the present disclosure is merely an embodiment, and the present disclosure can be implemented in various modifications and improvements based on the knowledge of a person skilled in the art.

What is claimed is:

1. A convoy travel control device that automatically switches a speed change of an automatic transmission of a following vehicle from a traveling state of a leading vehicle when convoy travel is performed by a plurality of vehicles with autonomous driving, the convoy travel control device comprising:
   a convoy participation time speed change control unit that determines a target gear stage of the automatic transmission of the following vehicle based on a target acceleration and a target vehicle speed of the leading vehicle and switches an actual gear stage of the automatic transmission of the following vehicle to the target gear stage in advance when the target gear stage and the actual gear stage of the automatic transmission of the following vehicle are different, wherein,
   when a change in the target acceleration of the leading vehicle falls below a predetermined value, the convoy participation time speed change control unit switches the actual gear stage of the automatic transmission of the following vehicle to the target gear stage at a second speed change speed, and when a change in the target acceleration of the leading vehicle is equal to or more than the predetermined value, the convoy participation time speed change control unit switches the actual gear stage of the automatic transmission of the following vehicle to the target gear stage at a first speed change speed higher than the second speed change speed.

* * * * *